United States Patent [19]
Eisler et al.

[11] Patent Number: 6,128,713
[45] Date of Patent: Oct. 3, 2000

[54] APPLICATION PROGRAMMING INTERFACE ENABLING APPLICATION PROGRAMS TO CONTROL ALLOCATION OF PHYSICAL MEMORY IN A VIRTUAL MEMORY SYSTEM

[75] Inventors: Craig G. Eisler; G. Eric Engstrom, both of Kirkland, Wash.

[73] Assignee: Microsoft Corporation, Redmond, Wash.

[21] Appl. No.: 08/937,059

[22] Filed: Sep. 24, 1997

[51] Int. Cl.[7] .................................................. G06F 12/02
[52] U.S. Cl. ..................... 711/159; 711/160; 711/134; 711/136; 711/173; 709/104; 709/107; 709/108
[58] Field of Search .................................. 711/203, 206, 711/208, 209, 159, 160, 133, 134, 136, 173; 709/104, 107, 108

[56] References Cited

U.S. PATENT DOCUMENTS

| | | | |
|---|---|---|---|
| 4,688,167 | 8/1987 | Agarwal | 345/343 |
| 4,967,353 | 10/1990 | Brenner et al. | 711/160 |
| 5,125,086 | 6/1992 | Perazzoli, Jr. | 711/159 |
| 5,386,536 | 1/1995 | Courts et al. | 711/136 |
| 5,394,537 | 2/1995 | Courts et al. | 711/202 |
| 5,499,354 | 3/1996 | Aschoff etal. | 711/129 |
| 5,572,694 | 11/1996 | Uchino | 711/6 |
| 5,606,685 | 2/1997 | Frandeen | 711/117 |
| 5,611,064 | 3/1997 | Maund et al. | 711/209 |
| 5,727,178 | 3/1998 | Pletcher et al. | 711/202 |

FOREIGN PATENT DOCUMENTS

| | | |
|---|---|---|
| 0 620 523 A2 | 10/1994 | European Pat. Off. . |
| 0 620 523 A3 | 10/1994 | European Pat. Off. . |
| 0 713 176 A2 | 5/1996 | European Pat. Off. . |
| 0 713 176 A3 | 5/1996 | European Pat. Off. . |

OTHER PUBLICATIONS

PCT/US98/16800—International Search Report. Sep. 12, 1998.

"Method of Extending OS/2's Memory management to Recognize User Focus", *IBM Technical Disclosure Bulletin*, vol. 35, No. 1A, Jun. 1992, pp. 470–472.

V. Sohal, Reliable Memory Management for Real–Time Sytems, *Electronic Design*, vol. 44, No. 13, Jun. 1996, pp. 118, 120, 122, 124 XP000625394, see p. 120, right–hand col., line 7–page 124, left–hand col., line 39.

(List continued on next page.)

*Primary Examiner*—Hiep T. Nguyen
*Attorney, Agent, or Firm*—Klarquist Sparkman Campbell Leigh & Whinston LLP

[57] ABSTRACT

An application programming interface (API) enables application programs in a multitasking operating environment to control the allocation of physical memory in a virtual memory system. One API function enables applications to designate a soft page lock for code and data. The operating system ensures that the designated code and data is in physical memory when the application has the focus. When the application loses the focus, the pages associated with the code or data are released. When the application regains the focus, the operating system re-loads the pages into physical memory before the application begins to execute. The operating system is allowed to override the soft page lock where necessary. Another API enables applications to designate code or data that should have high priority access to physical memory, without using a lock. This API enables the application to specifically control the likelihood that a piece of code or data will remain in physical memory by assigning a priority to the code or data that defines its priority relative to the priority of other code or data contending for the same physical memory.

25 Claims, 5 Drawing Sheets

OTHER PUBLICATIONS

"Packing Variable–Sized Segments in the Swap File of a Paging–Based Virtual Memory System", *IBM Technical Disclosure Bulletin,* vol. 39, No. 3, Mar. 1996, pp. 301/302 XP000581702.

Adrian King, Intel Processor Architecture, *Inside Windows 95,* Microsoft Press, 1994, pp. 45–56.

Adrian King, A Tour of Chicago, *Inside Windows 95,* Microsoft Press, 1994, pp. 85–90.

Adrian King, The Base System, *Inside Windows 95,* Microsoft Press, 1994, pp. 121–131.

Device Driver Kit (DDK) for the Windows Operating System, Microsoft Corporation, 1995, Chaps. 1, 6, 11, 15.

APPLICATION PROGRAMMING INTERFACE ENABLING APPLICATION PROGRAMS TO CONTROL ALLOCATION OF PHYSICAL MEMORY IN A VIRTUAL MEMORY SYSTEM

FIELD OF THE INVENTION

The invention relates to management of virtual memory in a computer, and more specifically relates to a method for controlling allocation of physical memory in a computer that uses virtual memory to enable concurrently executing programs to share physical memory.

BACKGROUND OF THE INVENTION

The term "virtual memory" refers to a method for allowing several concurrently running application programs to share the physical memory of a computer. The physical memory refers to the main memory of a computer used to execute computer programs and is typically implemented with Random Access Memory (RAM). Multitasking operating systems typically use virtual memory to expand the memory available to each of the application programs executing in the computer. Virtual memory has the effect of making memory appear much larger to applications. To create this effect, a virtual memory manager (VMM) allocates memory from a virtual memory space that is much larger than the size of physical memory. The VMM uses secondary storage space in the computer such as a hard disk to extend the effective size of physical memory. The VMM only loads code and data from secondary storage to physical memory when an application actually needs it, e.g., to process a read or write request.

When a program makes a read or write request to virtual memory, the virtual memory manager determines whether the code or data requested is either located in physical memory or in secondary storage. If it is in physical memory, the virtual memory manager maps the virtual address into a physical address where it is located in physical memory. On the other hand, if the code or data is not in physical memory, the virtual memory manager fetches it from the secondary storage device and places it in physical memory. Thus, the virtual memory manager makes the physical memory appear larger to the application by swapping program code and data in and out of physical memory as needed to satisfy memory requests.

To illustrate the concept of virtual memory, consider an example of an operating system executing on a personal computer with 4 megabytes of physical memory and a hard drive with additional free memory space. The operating system itself might occupy up to a megabyte of the physical memory. If the user wishes to launch a game program occupying 2 Megabytes from the hard drive, then the total memory occupied in physical memory is about 3 Megabytes. Now assume that the game program attempts to load additional code or data files exceeding 1 Megabyte. Under these circumstances there is insufficient physical memory to hold the code and data for the currently executing programs in the computer.

The VMM solves this problem by swapping code and data needed to run the executing programs back and forth between physical memory and the hard drive. For example, if the instructions of a particular piece of code are to be executed, the piece of code must be loaded into physical memory of the computer. Other pieces of code can stay on disk until they are needed. Whenever a piece of code or data is not held in physical memory, the operating system marks its absence by setting (or clearing) a flag associated with that code or data. Then, if an access to that code or data is attempted, the processor will generate a not present interrupt that notifies the operating system of the problem. The operating system then arranges to load the missing code or data into an available area of physical memory and restarts the program that caused the interrupt. The swapping of code and data to and from the hard drive and the interrupts are transparent to the application programs executing in the computer in the sense that the application programs do not process the interrupt nor manage swapping of data back and forth. Rather, the application program only deals with a virtual address space of virtual memory, and the operating system maps requests for virtual memory to physical memory and swaps data back and forth between physical memory and the hard drive.

In a typical virtual memory system, some operating system components are guaranteed access to a portion of physical memory and several other software components contend for the remainder of physical memory. Operating system components that always occupy physical memory include memory resident components of the operating system kernel and a disk cache. The remainder of the physical memory is shared among other software such as dynamically loaded operating system components (DLLs), application program code and data, and dynamically allocated regions of memory such as Direct Memory Access (DMA) buffers and cache regions for the operating system's file system.

The operating system components that always occupy physical memory have a "lock" on a portion of the physical memory. A "lock" is an attribute of a memory management system that commits or reserves a portion of physical memory to a piece of code or data. In many operating systems, it is typical for a lock to be on a portion of physical memory if that memory contains a piece of code that must be able to run at interrupt time or a piece of data that needs to be accessible at interrupt time or that needs to be accessed asynchronously by hardware devices in the computer.

Initially, the operating system allocates virtual memory to the application programs. However, the operating system will not actually allocate physical memory to an application program until that program attempts to access memory. As code executing in the system attempts to access memory allocated to it, the operating system will allocate physical memory until it is filled, and then start to swap portions of physical memory to the hard drive to accommodate memory accesses.

The virtual memory system typically uses a portion of the hard drive, called a swap file, to swap code and data to and from physical memory. The operating system loads program code such as the executable code of an application program (e.g., a .exe file) directly from the hard drive. As an application requests access to program data, the operating system allocates physical memory, and subsequently, swaps this program data to and from physical memory once physical memory is filled up.

At run time, an application can either implicitly or explicitly request additional memory. An implicit request occurs when an application asks the operating system for a resource such as a new window, and the operating system allocates memory as a side effect to responding to the request for the resource. An explicit request occurs when the application directly invokes a function to specifically ask the operating system to allocate extra memory to it. In both cases, the operating system claims memory for resource allocation from virtual address space.

One form of virtual memory in common use today is referred to as paged virtual memory. In a paged virtual memory scheme, the operating system carries out all memory allocation, de-allocation, and swapping operations in units of memory called pages. In a microprocessor compatible with the 386 architecture from Intel Corporation, for example, a memory page is 4K and each memory segment is made up of one or more 4K pages. The Windows® 95 operating system is one example of an operating system that implements a paged virtual memory system.

Terms commonly used to describe a paged virtual memory scheme include paging, page file, and page fault. The term "paging" refers to the process of swapping code or data between physical memory and secondary storage. The term "page file" refers to the swap file maintained in a secondary storage device to hold pages of code and data swapped to and from the physical memory. Finally, the term "page fault" refers to an interrupt generated by a microprocessor indicating that the memory request cannot be satisfied from physical memory because the page containing the requested code or data is not located in physical memory.

The implementation details of any virtual memory system vary depending on the design and memory addressing scheme of the processor. One of the most widely spread processor architectures in the personal computer industry is the 386 architecture from Intel Corp. The basic memory management features of this architecture are used in 486, Pentium, Pentium II, and Pentium Pro microprocessors from Intel Corp. The 386 architecture supports three operating modes: real mode, protected mode, and virtual mode. Real mode refers to a mode used to maintain compatibility with the 8086 line of processors. This mode has a segmented memory architecture that employs four segment registers to address up to 1 Megabyte of memory. Each segment register points to a first byte of a memory segment. The address register stores on offset address to a byte within a memory segment. The processor combines the contents of a segment register with an address register to form a complete address.

In protected mode, the processor uses the contents of the segment register to access an 8 byte area of memory called a descriptor. The segment register contains an index into a table of descriptors. The processor uses the information in the descriptor to form a base address. It then combines an offset address from the application program to the base address to compute a physical memory address. In this mode, the operating system can use any suitable area of physical memory as a segment. The segments of an application need not be contiguous and can have different sizes.

Virtual mode is similar to protected mode in that it uses the same notion of segments, except that a single segment can be 4 Gigabytes instead of only one Megabyte, and it enables the operating system to implement a virtual memory scheme. Like protected mode, a processor in virtual mode uses the contents of a segment register as an index into a descriptor table. The descriptor table specifies the base address of a memory segment. The operating system sets up the base register to point to the first byte of a program's code or data segment. The processor combines a 32 bit offset address to the base address to compute a final 32 bit address.

When virtual memory is enabled in the 386 architecture, the processor alters the interpretation of this final 32 bit address to map it into a 32 bit physical address. During initialization, the operating system switches the processor into protected mode and then enables paging. The 32 bit address computed by combining the base address with the offset from the program is an address in virtual memory space.

With paging enabled, the processor maps this address in virtual memory space to an address in physical memory space. FIG. 1 is a diagram illustrating how the processor interprets the 32-bit address from an application. The top 10 bits (31 . . . 22) (see 20 in FIG. 1) are an index into a page table directory (22 in FIG. 1). Part of each 32-bit quantity in a page table directory points to a page table (24 in FIG. 1). The next 10 bits of the original address (20 . . . 12) (see 26 in FIG. 1) are an index into the particular page table. Part of each page table entry (28) points to a page of physical memory. The remaining 12 bits of the virtual address (11 . . . 0) (30 in FIG. 1) form an offset within this page of memory.

The operating system stores the address of the page table directory for the current program in a special processor register called CR3 (32). Each time the operating system switches tasks, it can reload CR3 so that it points to the page directory for the new program. The process of mapping a virtual address into a physical address is performed within the processor. Memory caching techniques ensure that frequently used page table entries are available with no additional memory references.

To fully support the virtual memory scheme, page table entries contain more than just a pointer to a page table or physical address. FIG. 2 shows the contents of a single 32-bit word in both the page table directory and page table entry structures (see items 40 and 42 in FIG. 2). The page table directory and each page table consume one 4K memory page (1024 entries in each). This allows the entire 4 GB of a program's address space to be properly addressed. The flag bits in the page table directory allow the system to store the page tables themselves on disk in the paging file. Thus, for large programs (for example, a 1-GB program, which will need 256 page table pages), the system will swap page tables as well as program code and data pages in and out of physical memory.

To fully support the virtual memory operations and the 386 memory protection system, the page directory and page table entries include a number of flag bits. The processor itself modifies some of these flags directly. The operating system manages others. As shown in FIG. 2, these flags include the following bits: D, A, U/S, R/W, and P.

Whenever a program modifies the contents of a memory page, the processor sets the corresponding page table dirty bit (the D bit in FIG. 2). This tells the operating system that if it wants to remove the page from memory to free up space, then it must first write the page out to disk to preserve the modifications.

Any reference—read, write, or execute—to a page causes the processor to set the accessed bit (the A bit in FIG. 2) in the corresponding page table entry. The virtual memory manager can use this flag to determine how often a page has been accessed. One way to tell how frequently a page has been accessed is to set and check this bit periodically to determine whether the page has been accessed. The access bit of a page that is used infrequently will not change if the hardware has not set the access bit. Removing that page from memory is probably a better choice than removing a page that was definitely in use during the same time period. The Windows® 95 operating system uses an algorithm known as least recently used (LRU) to determine which page to remove from memory. The more recently used page, the less likely it is to be re-allocated.

The present bit (the P bit) is set to 1 only when the page table or memory page addressed by the table entry is actually present in memory. If a program tries to reference a page or page table that is not present, the processor generates a not-present interrupt and the operating system must arrange to load the page into memory and restart the program that needed the page.

The user/supervisor bit (the U/S bit) is part of the 386's overall protection system. If the U/S bit is set to 0, the memory page is a supervisor page—that is, it is part of the memory of the operating system itself and no user-level program can access the page. Any attempted access causes an interrupt that the operating system must deal with.

The read/write bit (the R/W bit) determines whether a program that is granted access to the corresponding memory page can modify the contents of the page. A value of 1 allows page content modification. A value of 0 prevents any program from modifying the data in the page. Normally, pages containing program code are set up as read-only pages.

The memory addressing scheme described above enables the operating system to implement a virtual memory system. One limitation of modem operating systems is that they fail to allow applications the flexibility to control how physical memory is allocated when virtual memory is enabled. Typically, the application programs only have access to a virtual memory space, and have little or no control over how the operating system allocates physical memory. In performing a swapping algorithm, it is typical for virtual memory management systems to load a small number of pages at a time in response to a page fault. This is inefficient because it tends to cause more page faults to occur as the application program attempts to access other portions of its virtual memory. Due to the latency in loading data from a hard drive, repeated page faults degrade the performance of the application as it waits for the operating system to load in the code or data that it needs to run. In multimedia and highly interactive applications, this latency can manifest itself as stuttering motion of graphical objects on the display and lack of responsiveness to user input. For example, operation of a game program will appear to stutter when the operating system is processing page faults.

As noted above, some operating systems, such as the Windows® 95 Operating System from Microsoft Corp., implement virtual memory using a LRU algorithm to control swapping of pages to and from physical memory. As a general rule, this virtual memory system gives the pages of the operating system's dynamically loaded components and all of the pages of the application programs equal priority. Thus, if a game application becomes inactive temporarily, the operating system is likely to swap its pages out of physical memory. When the application becomes active again, the motion of objects on the display and responsiveness of the game to user input stutters as the operating system gradually swaps pages back into physical memory.

One way to address this problem is to lock the physical memory allocated to the application so that no other code has access to that portion of physical memory. For example, in the Windows® Operating system, an application can request a page lock for a piece of physical memory. The page lock causes the operating system to commit a portion of physical memory and remove it from the pool of physical memory available to other executing code. This is not an acceptable solution because it can lead to extremely poor system performance as concurrently executing applications need access to physical memory but are unable to get it due to another application's lock on physical memory.

SUMMARY OF THE INVENTION

The invention is a method for enabling application programs to control allocation of physical memory in a virtual memory system. One aspect of the invention enables concurrently executing application programs to request a soft lock on physical memory for code or data that they designate. A soft lock, in this case, means that the operating system can override the lock under certain conditions, such as when the application loses the focus or a high priority process like an operating system component needs access to physical memory.

Another aspect of the invention enables applications to specify the level of priority of its code or data to be used to determine the order in which the virtual memory system swap units of memory (e.g., pages) from physical memory to secondary storage. For example, the application can specify that a portion of code or a data structure will be frequently used or most frequently used. The virtual memory system then uses this explicit priority, rather than the priority that it computes, to determine which units of memory to swap to secondary storage. This is different from a soft lock in that the units of memory are not removed from the available memory pool. Through this API, the application can override the level of priority computed by the virtual memory system and increase the chances that the designated code or data will remain in physical memory.

One implementation of the invention is an application programming interface (API) for virtual memory in a multitasking operating system that allows applications to specify priority of access to physical memory for code and data. One API function call enables applications to specify code and data that will have a soft lock on physical memory. While the application that has requested the soft lock has the focus, the specified code or data will have a lock on physical memory. When the application loses focus, the API releases the lock on physical memory, but it retains state information identifying the portions of code or data that held a soft lock on physical memory. When the application regains the focus, the API causes the physical memory manager to reload the code or data associated with the soft page lock into physical memory.

While the soft lock is in effect, the operating system can override the lock when predetermined conditions are detected. These predetermined conditions include cases where the amount of available physical memory drops below a threshold or a high priority process needs access to physical memory. A memory monitor is responsible for detecting these conditions and releasing the soft lock. In one specific implementation, the memory monitor gradually releases the soft lock by releasing parts of the portion of memory subject to the soft lock.

A second API function call enables an application to specify code or data that will have a higher priority to physical memory. This API is used in connection with the physical memory manager to make it less likely that certain code or data will be swapped from physical memory back to secondary storage.

The memory management methods and APIs summarized above provide a number of advantages. They enable application programs to attain better performance because they can use the APIs to control allocation of physical memory and reduce the chances of page faults occurring in response to memory requests. The soft lock prevents one application from degrading the performance of other applications and operating system components because the operating system can override it.

Additional features and advantages of the invention will become more apparent from the following detailed description and accompanying drawings.

DETAILED DESCRIPTION

The invention is directed toward a method and system for enabling application programs to control the allocation of physical memory in a virtual memory system. In one embodiment, the invention is incorporated in an application programming interface (API) for the Windows® 95 Operating System, marketed by Microsoft Corporation of Redmond, Wash. Briefly described, the API provides a series of functions or API calls that allow applications to control how the operating system manages access to physical memory.

Figure 1:
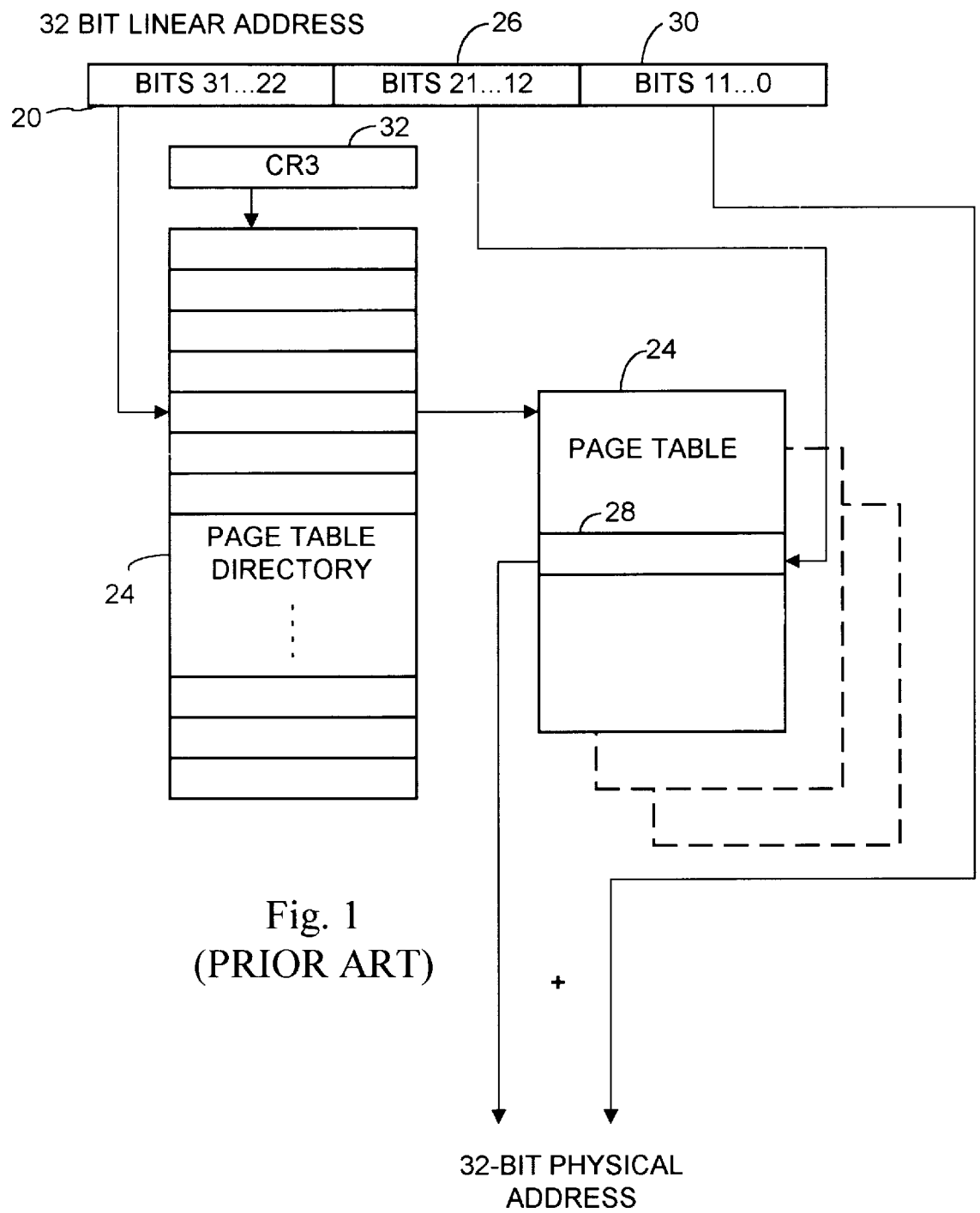
FIG. 1 is a diagram illustrating a virtual memory addressing scheme in the 386 processor architecture.
Figure 2:
FIG. 2 is a diagram illustrating entries in the page table directory and page table shown in FIG. 1.
Figure 2:
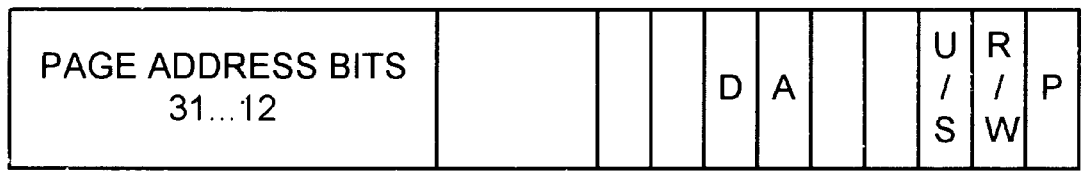
Figure 3:
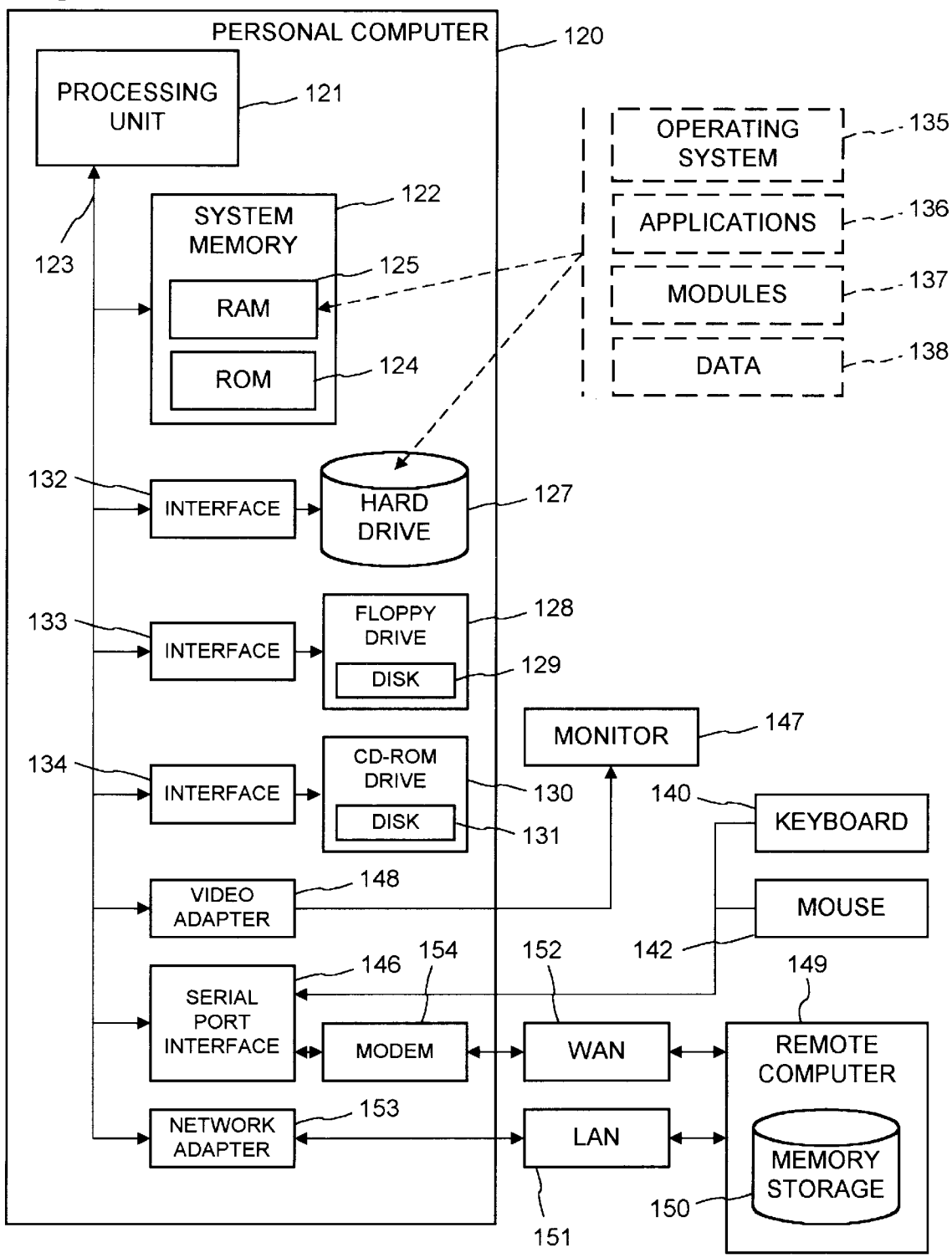
FIG. 3 is a diagram illustrating a computer system that serves as an operating environment for an implementation of the invention.

FIG. 3 and the following discussion are intended to provide a brief, general description of a suitable computing environment in which the invention may be implemented. While the invention will be described in the general context of computer-executable instructions of a computer program that runs on a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

FIG. 3 illustrates an example of a computer system that serves as an operating environment for the invention. The computer system includes a personal computer 120, including a processing unit 121, a system memory 122, and a system bus 123 that interconnects various system components including the system memory to the processing unit 121. The system bus may comprise any of several types of bus structures including a memory bus or memory controller, a peripheral bus, and a local bus using a bus architecture such as PCI, VESA, Microchannel (MCA), ISA and EISA, to name a few. The system memory includes read only memory (ROM) 124 and random access memory (RAM) 125. A basic input/output system (BIOS), containing the basic routines that help to transfer information between elements within the personal computer 120, such as during start-up, is stored in ROM 124. The personal computer 120 further includes a hard disk drive 127, a magnetic disk drive 128, e.g., to read from or write to a removable disk 129, and an optical disk drive 130, e.g., for reading a CD-ROM disk 131 or to read from or write to other optical media. The hard disk drive 127, magnetic disk drive 128, and optical disk drive 130 are connected to the system bus 123 by a hard disk drive interface 132, a magnetic disk drive interface 133, and an optical drive interface 134, respectively. The drives and their associated computer-readable media provide nonvolatile storage of data, data structures, computer-executable instructions (program code such as dynamic link libraries, and executable files), etc. for the personal computer 120. Although the description of computer-readable media above refers to a hard disk, a removable magnetic disk and a CD, it can also include other types of media that are readable by a computer, such as magnetic cassettes, flash memory cards, digital video disks, Bernoulli cartridges, and the like.

A number of program modules may be stored in the drives and RAM 125, including an operating system 135, one or more application programs 136, other program modules 137, and program data 138. A user may enter commands and information into the personal computer 120 through a keyboard 140 and pointing device, such as a mouse 142. Other input devices (not shown) may include a microphone, joystick, game pad, satellite dish, scanner, or the like. These and other input devices are often connected to the processing unit 121 through a serial port interface 146 that is coupled to the system bus, but may be connected by other interfaces, such as a parallel port, game port or a universal serial bus (USB). A monitor 147 or other type of display device is also connected to the system bus 123 via an interface, such as a video adapter 148. In addition to the monitor, personal computers typically include other peripheral output devices (not shown), such as speakers and printers.

The personal computer 120 may operate in a networked environment using logical connections to one or more remote computers, such as a remote computer 149. The remote computer 149 may be a server, a router, a peer device or other common network node, and typically includes many or all of the elements described relative to the personal computer 120, although only a memory storage device 150 has been illustrated in FIG. 3. The logical connections depicted in FIG. 3 include a local area network (LAN) 151 and a wide area network (WAN) 152. Such networking environments are commonplace in offices, enterprise-wide computer networks, intranets and the Internet.

When used in a LAN networking environment, the personal computer 120 is connected to the local network 151 through a network interface or adapter 153. When used in a WAN networking environment, the personal computer 120 typically includes a modem 154 or other means for establishing communications over the wide area network 152, such as the Internet. The modem 154, which may be internal or external, is connected to the system bus 123 via the serial port interface 146. In a networked environment, program modules depicted relative to the personal computer 120, or portions thereof, may be stored in the remote memory storage device. It will be appreciated that the network connections shown are exemplary and other means of establishing a communications link between the computers may be used.

One embodiment of the invention is an API for a multitasking operating system that enables concurrently executing application programs to control how a virtual memory management system allocates physical memory. To control how the operating system allocates physical memory, an application invokes an API function and designates the code or data that it wishes to control and provides a priority parameter indicating the priority that it will have to physical memory. The operating system keeps track of the code or data that the application has designated and uses the priority to determine whether to swap the code or data out of the physical memory and back to the hard drive.

In the current implementation of the API, there are two levels of priority:

1) soft locked code or data; and
2) frequently used code or data.

Both of these priority levels provide a way for an application to set the level of priority of access to physical memory relative to other concurrently executing application programs.

The first level of priority, the soft lock, gives the designated code or data a lock on physical memory that can change depending on the status of the application program that has requested the lock. Specifically, the operating system allocates and reserves physical memory for the designated code as long as the application has the focus. The focus refers to the application, executing in the computer, that is currently active and is responsive to any input from the user. In the Windows® Operating System, an application has the focus when one of its windows is active and receiving user input, such as the press of a key on the keyboard or a click of a mouse button. The user can change the focus by pressing the Alt and TAB keys at the same time or selecting a new task from a drop-down menu.

When the application has the focus, the designated code or data has a lock on physical memory with respect to all other executing application programs. The soft lock precludes the operating system from swapping the designated code or data that resides in physical memory to the hard drive in order to allocate physical memory to another application. However, in some circumstances, the operating system can override the soft lock. The operating system overrides the soft lock when higher priority code needs access to physical memory.

When the application loses the focus, the operating system releases the locked code or data in physical memory so that the operating system can swap this code or data to the hard drive. To release the locked code or data, the operating system changes the state information associated with the pages of memory that store it so that the virtual memory system will swap these pages to the hard drive as necessary to allocate physical memory to other code or data.

The implementation of the soft lock API stores a list of the memory sections for which an application has requested a soft lock. When the application regains the focus, the operating system uses the list to determine which portions of the designated code and data, if any, to reload into physical memory. The operating system reloads these portions all at one time, before the application resumes after re-gaining focus.

The second level of priority is not specifically tied to the focus. When an application designates the "frequently-used" priority level for code or data, it causes the operating system to explicitly assign a priority value to the designated code or data. When the operating system needs to swap a section of physical memory back to the hard drive, it determines which section or sections to transfer based on their priority value. The frequently-used priority level enables an application to override the priority that the operating system has computed in the swapping algorithm.

While managing the allocation of physical memory, the operating system assigns a priority to all code and data that occupies physical memory based on the swapping algorithm used to control swapping of memory sections to and from the physical memory. In the current implementation for the Windows® 95 operating system, the priority of all code and data that forms part of the physical memory participating in the virtual memory system is assigned based on a Least Recently Used algorithm. The operating system evaluates how frequently each page is accessed and assigns a default priority based on this information. If the application designates that pieces of code or data are frequently used, the operating system overrides the default priority by artificially making it appear that the designated code or data has been accessed frequently.

While the current implementation enables an application to specify the two levels of priority described above, it also possible to create additional levels of priority using a similar approach. For example, in a least recently used scheme, the operating system can alter the priority level of specific code or data by adjusting the value of the parameter that indicates how recently or how frequently a piece of virtual memory has been accessed. A sliding scale of priority can be established by making the priority value adjustable in a range, starting from a low value (meaning least frequently used), and continuing up to the highest value (most frequently used). The memory manager in the operating system is most likely to swap pages on the low end of the scale and least likely to swap pages on the high end of the scale.

In the current implementation, applications designate the priority for specific pieces of code and data by invoking an API function call and specifying the address and size of the code or data. For code, the application can specify the name of the function or functions in the source code of the application, which implicitly provides the address of the executable code. For data, the application can specify a pointer to a data structure as well as the size of the structure.

Figure 4:
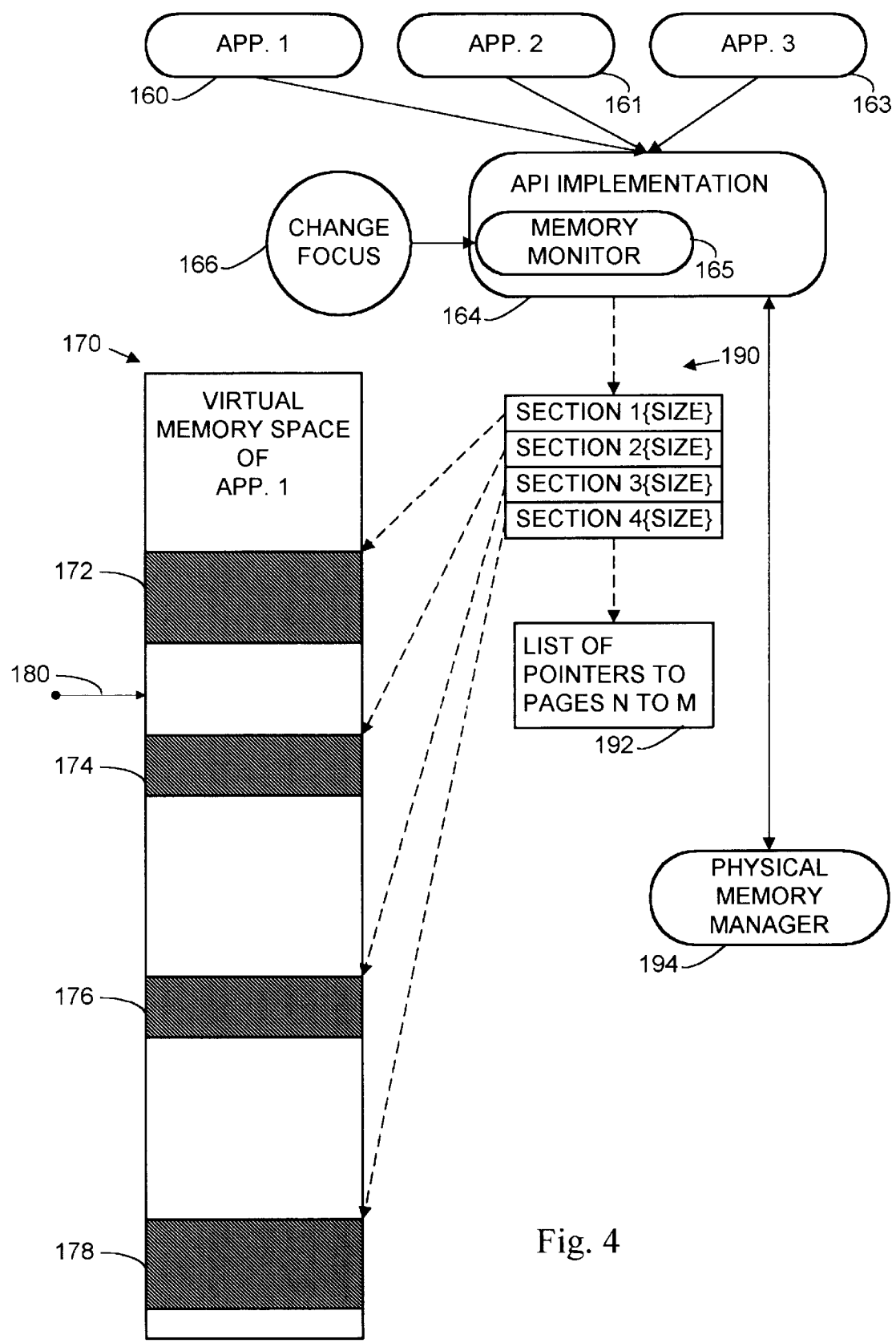
FIG. 4 is a diagram illustrating the operation of a soft lock function that enables application programs to control physical memory allocation in a virtual memory system.

FIG. 4 is a diagram illustrating the operation of APIs for controlling memory allocation. The applications (apps. 1–3) (160,161,163) represent concurrently executing applications in a computer, sharing physical memory of the computer. These applications can control the allocation of physical memory by invoking functions of the API implementation 164. A specific example and accompanying description of the API implementation is provided below.

The API implementation 164 includes a memory monitor 165 that monitors the focus in the operating system. It hooks messages (e.g., message 166) from the Windows® operating system indicating that the focus has changed from one application to another. One implementation hooks messages corresponding to user input from the operating system to the application's window (or windows). These messages indicate which application is active and currently responsive to user input. Another implementation uses operating system services, namely a shell hook, to receive notifications about changes in focus from one application to another.

In the example shown in FIG. 4, the diagram illustrates an example of the virtual address space 170 allocated to an application (app. 1). The marked sections 172–178 represent pieces of virtual memory associated with code or data for which the application has requested a soft lock. When an application requests a soft lock, the API implementation identifies the sections of virtual memory allocated to the designated code or data. It creates a data structure 190 listing the sections of virtual memory allocated to the designated code and data. From the structure 190, which stores the location and size of the designated code and data, the API implementation computes the specific units of memory that are used to store the code and data. This implementation is designed for the paging scheme of the 386 architecture, and thus, the units of memory are 4K pages. The API implementation computes the pages that correspond to the designated code and data.

When the application initially invokes a soft lock, the API implementation instructs a physical memory manager 194 to allocate physical memory to the designated code and data. The physical memory manager loads the corresponding sections of code or data into physical memory that are not already loaded, using the list of pages 192 computed from the structure 190.

In this implementation, the physical memory manager 194 is part of the Windows® 95 operating system. It includes a series of functions that enable the memory monitor to lock and unlock blocks of memory. These blocks of memory correspond to ranges of pages used to store code or data.

The memory monitor 165 manages a soft lock by monitoring the focus and the state of physical memory allocation. If application 1 loses the focus, the memory monitor 165 retains the data structure 190 and the list of pages 192 associated with it. The memory monitor monitors for changes in focus. If application I regains the focus, the memory monitor invokes the appropriate functions of the physical memory manager 194 to re-load and re-lock the list of pages corresponding to the memory sections stored in the structure 190. In response, the physical memory manager checks the status of the pages in the list and re-loads the ones that have been swapped to the hard drive. It also marks the status of all of the soft-locked pages as locked. Note that the physical memory manager 194 may have swapped portions of the soft-locked code or data back to secondary storage (namely, the hard drive in the computer). Other portions may still remain in physical memory (RAM in the computer). The memory monitor ensures that all of the soft-locked code and data is back in physical memory and locked before the application resumes execution.

The physical memory manager in the Windows® 95 operating system stores a page descriptor structure for every active page. This structure holds the addresses of routines used to move the page back and forth between physical memory and the hard disk. The physical memory manager also includes services (function calls) for locking and unlocking pages. The memory monitor uses these services of the physical memory manager to load, lock, and unlock pages.

Once the soft-lock is restored, the application resumes executing. As an example, assume that the application resumes execution at the instruction labeled with reference 180 in FIG. 4. Before the application resumes execution at this instruction, the memory monitor 165 instructs the physical memory manager 194 to re-lock sections 1–4. The physical memory manager then loads any pages in sections 1–4 that are not in physical memory and marks all of the pages in sections 1–4 as locked. Note that the memory monitor ensures that the soft lock is restored in the same way regardless of where the application resumes execution. The memory monitor invokes the physical memory manager to load and lock all of the pages associated with the soft locked code or data, even if the application resumes execution in a code section that is not soft locked.

The operation of the soft lock when an application regains the focus is an improvement over conventional operating systems that typically only reload a portion of code near the instruction where the application resumes executing. This tends to increase the chances of page faults over time as the application accesses other portions of its code or data not located near this instruction. With the soft lock, the application is assured of having access to physical memory, without a page fault, for an entire group of designated code and data.

In the current implementation of the soft page lock, the operating system can override the soft page lock if it deems it necessary to free up additional physical memory for some higher priority task. The application cannot, therefore, use memory designated with a soft page lock for storing interrupt services or DMA buffers.

The memory monitor monitors the status of physical memory allocation and manages the process of releasing a soft-lock when the operating system needs to override the soft-lock. The physical memory manager 194 notifies the memory monitor 165 of conditions that require a release of the soft-lock. One way it accomplishes this is by monitoring the amount of available physical memory and sending a message to the memory monitor when the amount of available memory passes beyond a predetermined threshold.

Another way is by sending a message to the memory monitor when a high priority process has attempted access to memory, and there is insufficient physical memory available to satisfy the high priority process. The operating system defines whether a process is high priority. Priority can be pre-assigned or determined dynamically (at run time). One way to assign a priority of a process is to use its scheduling priority. If the process has high priority in terms of how the scheduler in the operating system allocates processor time, then it has high priority access to physical memory. For example, in a preemptive multi-tasking operating system like Windows® 95, a background process may be assigned a high priority so that it gets allocated CPU time. In the current implementation, if a high priority background process makes a request for physical memory and there is insufficient physical memory available, the physical memory manager 194 will notify the memory monitor 165. The memory monitor will then release all or some portion of the soft-locked memory.

To release a portion of the soft locked memory, the memory monitor 165 uses a LRU algorithm to determine which portions to release first. Note that this is separate from the LRU algorithm that the physical memory manager uses to swap pages back and forth between physical memory and secondary storage to implement virtual memory. The memory monitor uses this LRU scheme to select pages in the pool of soft locked memory to release when the physical memory manager notifies it to override the soft lock. Since a released page may contain valid code or data, it is returned to the pool of pages that the physical memory manager can swap back and forth between physical memory and secondary storage.

While this implementation uses an LRU approach to determine which portions of soft locked memory to release first, other approaches can be used as well. For example, the memory monitor can be implemented so that it releases all of the soft-locked memory of the application that requested the soft lock. In this case, all of the soft locked pages become subject to the virtual memory scheme and can be swapped to secondary storage as needed to satisfy requests for physical memory.

The status of physical memory can be classified in two groups: locked and available. Whenever a piece of code or data has a lock on physical memory, the portion of physical memory allocated to it is locked. The available memory comprises all of the sections of physical memory that are not locked and are ready to be allocated to a process that is attempting to lock or access memory. The physical memory manager determines the amount of physical memory that is available by determining which portions of physical memory are not locked and assigning this available memory to an available memory pool.

In a multitasking operating system, it is sometimes necessary to place limits on the amount of physical memory that an application can lock. Since the impact of an application's lock on physical memory varies depending on the type and number of concurrently running applications, it is useful to enable the end-user to adjust the maximum amount of physical memory that any one application program can lock. One way to implement this feature in the Windows® 95 operating system, for example, is to allow the user to adjust the amount of available physical memory that can be locked by an application. This adjustable amount can be specified as a percentage of the physical memory available after the operating system has locked a portion of it for operating system components. The adjustable amount can also be specified as a maximum amount of RAM in Megabytes that can be locked by an application. In the Windows® Operating system, this feature can be implemented as a graphical control such as slider bar that is responsive to input from a cursor control device such as a mouse. For example, the user could adjust the maximum percentage (or number of Megabytes of RAM) of physical memory that an application can lock by adjusting the sliding bar with a mouse up or down.

To enforce this limit on locking physical memory, the physical memory manager tracks the amount of memory that every application has locked and returns an error if the application attempts to lock more memory than the maximum amount. The physical memory manager tracks the amount of physical memory allocated to an application by the application's Process Identifier (PID). It maintains a structure that stores the amount of memory locked by each process, along with the PID. Before allowing an application to lock a portion of physical memory, the physical memory manager determines whether the request will cause the amount of memory locked by the application to exceed the maximum amount.

The limit on locking physical memory can apply to both a lock and a soft lock. However, since the operating system can override a soft lock, the physical memory manager can be implemented so that it does not apply the same limit on a soft lock. For example, if a process requests a lock and the total amount of memory locked by the process as a result of the lock exceeds the maximum, then the physical memory manager will return an error. If the same process then requests a soft lock for the same amount of memory, the physical memory manager will grant the request, assuming that there is sufficient available physical memory at the time of the request. The physical memory manager can grant this request because it can override the soft lock if a higher priority process needs access to physical memory.

Figure 5:
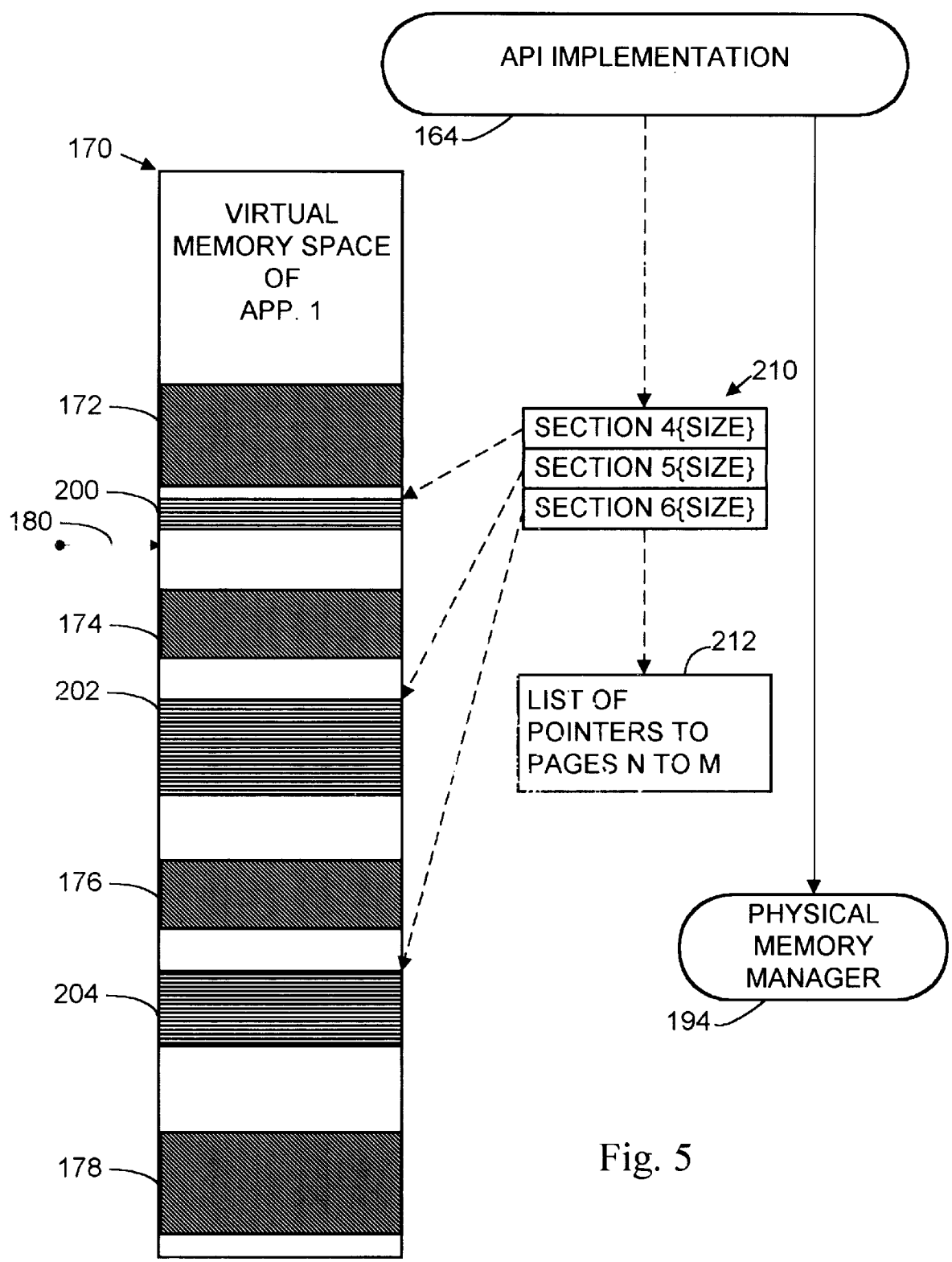
FIG. 5 is a diagram illustrating the operation of an API implementation that enables application programs to specify a level of priority to be used in virtual memory management to determine the order of swapping units of memory to secondary storage.

FIG. 5 is a diagram illustrating an example of how the implementation of FIG. 4 supports the "frequently-used" level of priority. An application can request this level of priority for code or data that it designates in a similar manner to requesting a soft lock. When it invokes the API function call, the application specifies the level of priority, the location of the code or data and the size of the code or data. In the example shown in FIG. 5, the application has specified three sections of virtual memory (200, 202, and 204) that will have the second level of priority. The application gives a pointer to the start of the code or data that is subject to the call and its size.

In response, the API implementation 164 creates a structure 210 that keeps track of the code or data that has the second level of priority. From this structure, the API implementation 164 can compute the units of memory, in this case pages, that correspond to the sections of virtual memory that store the specified code or data. The result is a list of pages 212 that have the second level of priority.

The API implementation then causes the physical memory manager to set the priority for each of the pages in the list 212. As described above, the physical memory manager implements an LRU scheme for virtual memory. It keeps track of how recently each page is used by keeping a reference count of memory accesses to each page. When a page is accessed, it receives a reference count. The physical memory manager uses this reference count to identify pages that are used least frequently. When no more physical memory is available to satisfy memory requests, the physical memory manager frees more physical memory by swapping the least recently used pages to secondary storage, as indicated by there reference count.

To set a page to the "frequently used" level of priority, the API implementation instructs the physical memory manager to set the reference count to a predetermined maximum value. This gives the pages designated by the API implementation a higher priority relative to other pages because they are least likely to be swapped from physical memory.

A description of one possible implementation of the API called "DirectMemory" is provided below. The first and second levels of priority of access to physical memory are implemented in the LOCK and UNLOCK functions. An application program can specify the soft lock by setting the SOFTLOCK parameter when invoking the LOCK function. Similarly the application program can specify the frequently used level of priority by setting the MOSTRECENTLY-USED parameter of the LOCK function.

---

DirectMemory::AddMemoryToGroup
    HRESULT
    DirectMemory::AddMemoryToGroup(dwGroupHandle,dwCount,lplpAddr,
    lpdwSize)
    Purpose
    Adds the specified memory blocks to a previously created group.
    Parameters
        dwGroupHandle
            This is the handle used to identify the previously created group.
        dwCount
            This indicates the number of blocks of memory in the list pointed at by lplpAddr.
        lplpAddr
            This is an array of pointers to the blocks of memory to be added to this group.
        lpdwSize
            This is an array of DWORDS which indicate tbe length of the blocks of memory
            pointed to by lplpAddr.

-continued

```
    Return Value
        DM_OK                           Operation succeeded.
        DMERR_BADGROUP                  This group was not created by CreateGroup.
DirectMemory::CreateGroup
    HRESULT DirectMemory::CreateGroup( dwFlags, lpdwGroupHandle,dwCount,
    lplpAddr, lpdwSize )
    Purpose
    Creates a group that contains sections of memory that should be treated as a single unit for
    purpose of virtual memory management. A group will be paged in, paged out,
    SOFTLOCKed and reference counted as a single piece.
    Parameters
        dwFlags
            DMGROUP_SOFTLOCK
            DMGROUP_PRELOAD
        lpdwGroupHandle
            Points to a DWORD where the new group handle will be returned.
        dwCount
            This is the number of blocks of memory in the list pointed at by lplpAddr.
        lplpAddr
            This is an array of pointers to the blocks of memory to be added to this group as it
            is being created.
        lpdwSize
            This is an array of DWORDS which indicate the length of the blocks of memory
            pointed to by lplpAddr.
    Return Value
        DM_OK                           Operation was a success.
        DMERR_BADDADDRESS               Physical address failed.
DirectMemory::DeleteMemoryFromGroup
    HRESULT DirectMemory::DeleteMemoryFromGroup(dwGroupHandle,dwCount,
    lplpAddr)
    Purpose
    Deletes tbe specified memory blocks from a previously created group. This call will fail if
    all of the blocks specified are not in the specified group.
    Parameters
        dwGroupHandle
            This is the handle used to identify the previously created group.
        dwCount
            This is the number of blocks of memory in the list pointed at by lplpAddr.
        lplpAddr
            This is an array of pointers to the blocks of memory to be added to this group.
    Return Value
        DM_OK                           Operation succeeded.
        DMERR_BADGROUP                  This group was not created by CreateGroup.
        DMERR_BADBLOCKS                 Some of the blocks specified are not part of
        this group.
DirectMemory::DestroyGroup
    HRESULT DirectMemory::DestroyGroup( dwGroupHandle )
    Purpose
    This function destroys a previously created group. All of the pages that are part of this
    group are freed. It is not necessary to delete all of the pages from a group before
    destroying it.
    Parameters
        dwGroupHandle
            Handle of group that was previously created by CreateGroup.
    Return Value
        DM_OK                           Operation was a success.
        DMERR_BADGROUP                  This group handle was not created by
        CreateGroup.
DirectMemory::GetMaxPhysicalMemory
    HRESULT DirectMemory::GetMaxPhysicalMemory( dwFlags,lpdwNumPages )
    Purpose
    Returns to the application the number of pages of physical memory available to an
    application in the best case scenario.
    Parameters
        dwFlags
            DMGMPM_EXCLUSIVEMODE    The physical memory pages for the
            application when it has focus.
            DMGMPM_SHARED           The physical memory pages for the
            application when it does not have focus.
        lpdwNumPages
            The number of 4K pages of physical memory.
    Return Value
        DM_OK                           Operation was successful.
DirectMemory::GetProcessWorkingSetSize
    HRESULT DirectMemory::GetProcessWorkingSetSize( dwFlags,lpdwNumPages )
    Purpose
    This API returns what the operating system considers an application's current working set
    needs to be.
    Parameters
```

-continued

```
    dwFlags
        DMSPWS_EXCLUSIVEMODE    The working set of the application when it
        has focus.
        DMSPWS_SHARED           The working set of the application when it
        does not have focus.
    lpdwNumPages
        Points to a DWORD where the number of 4K pages of physical memory that this
        application has reserved for it.
    Return Value
        DM_OK                   Operation was successful.
        DMERR_OUTOFMEMORY       Requested working set size is beyond the
        physical memory limitations of this system. The working set for the application was
        not changed.
DirectMemory:: SetCooperativeLevel
    HRESULT DirectMemory::SetCooperativeLevel( hWnd,dwFlags )
    Purpose
    To specify the way this application wishes to use DirectMemory and to provide the hWnd
    that DirectMemory should use to track the application's focus.
    Parameters
        hWnd
            This is the hWnd that represents the applications focus.
        dwFlags
            DMSCL_PRESERVESTATE     If this flag is set the memory state of the
            application is preserved when the application loses focus and is restored when the
            application regains focus before execution begins.
            DMSCL_EXCLUSIVEMODE     If this flag is set the LRU status of pages
            owned by an application are marked as NOT USED when the application loses
            focus. Any SOFTLOCKS are released. SOFTLOCKS will be restored when the
            application regains focus.
            DMSCL_SHARED            If this flag is set the application's
            SHAREDSOFTLOCKS are not released when it loses focus. There is less memory
            available to an application through SOFTLOCKS when it does not have the focus.
            See Lock for ways to specify SOFTLOCKS that survive focus loss.
    Return Value
        DM_OK                   Operation was a success.
        DMERR_BADHWND           The hwnd specified is invalid or of an
        incorrect type.
DirectMemory::SetProcessWorkingSetSize
    HRESULT DirectMemory::SetProcessWorkingSetSize( dwFlags,dwNumPages )
    Purpose
    This API allows an application to communicate its working set needs to the operating
    system so that amount of physical memory can be kept free for it.
    Parameters
        dwFlags
            DMSPWS_EXCLUSIVEMODE    The working set of the application when it
            has focus.
            DMSPWS_SHARED           The working set of the application when it
            does not have the focus.
        dwNumPages
            The number of 4K pages of memory that this application needs to have to avoid
            thrashing in normal usage scenarios.
    Return Value
        DM_OK                   Operation was successful.
        DMERR_OUTOFMEMORY       Requested working set size is beyond the
        physical memory limitations of this system. The working set for the application was
        not changed.
DirectMemory::Lock
    HRESULT Lock( dwFlags, lpAddr, dwSize )
    Purpose
    This API specifies the segment of memory that is to be tracked by DirectMemory. The
    segment will either be added to the SOFTLOCK pool or the MOSTRECENTLYUSED
    pool. The SOFTLOCK pool is restored and page locked when the application regains
    focus. The MOSTRECENTLYUSED pool is restored when the application gains focus.
    This call can fail if the amount of physical memory requested exceeds the application
    physical memory limitation specified by the end-user.
    SOFTLOCK requests are higher priority than MOSTRECENTLYUSED requests.
    SOFTLOCK's can be overridden when the operating system requires memory.
    SOFTLOCK memory should not be used for DMA or Interrupt Service Routines.
    Parameters
        dwFlags
            DMLOCK_SOFTLOCK         Page lock this memory when the
            application has focus.
            DMLOCK_SHAREDSOFTLOCK   Page lock this memory even when
            the application does not have the focus. All other rules for SOFTLOCK's apply,
            this memory may still be reclaimed by the operating system. The amount of
            memory that can be SOFTLOCKed by an application that does not have the focus
            is considerably more constrained. The application that has focus has priority.
            DMLOCK_MOSTRECENTLYUSED
```

-continued

```
    lpAddr
        Pointer to the start of the memory to be affected. This pointer is rounded down to
        the nearest 4K page boundary on 386 Architecture systems. The dwSize parameter
        is rounded up by the same amount.
    dwSize
        Length of the memory affected. The dwSize parameter is rounded up to the
        nearest 4K page.
    Return Values
        DM_OK                         Operation was a success.
        DMERR_OUTOFMEMORY             No physical memory left to satisfy this
        request.
DirectMemory::Unlock
    HRESULT DirectMemory::Unlock( lpAddr )
    Purpose
    To release a SOFTLOCK or MOSTRECENTLYUSED designation on a section of
    memory that was previously locked.
    Parameters
        lpAddr
            Pointer that was previously passed to Lock.
    Return Values
        DM_OK                         Operation was a success.
        DMERR_NOTLOCKED               Physical address was never locked.
```

While the invention is described with reference to a specific implementation, it is important to note that the invention is not limited to this particular implementation. The invention applies to a variety of multi-tasking operating systems that implement virtual memory and allow changes in focus among executing programs. The implementation above is designed for a paged virtual memory scheme, but it also applies to virtual memory schemes that manage virtual memory in other types of memory units.

In view of the many possible embodiments to which the principles of our invention may be applied, it should be recognized that the illustrated embodiment is only a preferred example of the invention and should not be taken as a limitation on the scope of the invention. Rather, the scope of the invention is defined by the following claims. We therefore claim as our invention all that comes within the scope and spirit of these claims.

We claim:

1. A method for allowing concurrently executing applications to control allocation of memory in a virtual memory system, the method comprising:

in response to a request from an application program to designate code or data for a soft page lock, loading the designated code or data into physical memory and committing a portion of physical memory to the designated code or data such that the virtual memory system is prevented from swapping the designated code or data to secondary storage;

monitoring focus among the concurrently executing application programs;

when the application loses focus, releasing at least a part of the portion of physical memory committed to the code or data so that the portion of physical memory can be used by other concurrently executing application programs; and when the application regains the focus, reloading the code or data released from the physical memory before the application begins executing.

2. The method of claim 1 further including:

monitoring allocation of physical memory to determine how much of the physical memory is available to be allocated to the concurrently running application programs; and when the amount of physical memory available to be allocated to the concurrently running application programs falls below a predetermined threshold, releasing at least a part of the portion of physical memory committed to the designated code or data so that the portion of physical memory can be used by other concurrently executing application programs.

3. The method of claim 1 further including:

when a high priority process requests access to the physical memory, overriding the soft lock by releasing at least a part of the portion of physical memory committed to the designated code or data so that the portion of physical memory can be used by other concurrently executing application programs.

4. The method of claim 2 wherein the step of releasing the portion of physical memory when the predetermined threshold is exceeded includes releasing parts of the portion in least recently used order.

5. The method of claim 3 wherein the step of overriding the soft lock includes releasing parts of the portion in least recently used order.

6. The method of claim 1 further including:

in response to a request from an application program to select a priority for physical memory allocation for a piece of code or data, marking a section of memory associated with the piece of code or data so that the code or data stored in the section is least likely to be swapped to secondary storage by the virtual memory system in response to a not present interrupt.

7. The method of claim 1 further including:

displaying an interactive user interface on a display monitor that enables an end-user to select a maximum amount of physical memory that will be allocated to the application program; and preventing the application program from locking a portion of physical memory when the amount of physical memory exclusively allocated to the application program exceeds the maximum.

8. The method of claim 1 wherein virtual memory is allocated in memory units of pages, and further including:

in response to the request for a soft lock, computing a list of pages corresponding to the designated code or data; and using the list to identify pages in the list that need to be re-loaded into the physical memory when the application regains the focus.

9. A computer readable medium having computer-executable instructions for performing the steps of claim 1.

10. An operating system comprising:

a physical memory manager for supporting a virtual memory space larger than physical memory in a computer by swapping code and data between the physical memory and secondary storage, and for managing a pool of physical memory available to be allocated to concurrently running application programs, including a function for committing sections of physical memory such that the committed sections are removed from the available pool and are exclusive to an application program;

an API implementation for receiving API calls from concurrently executing application programs, the API implementation including an API function call for requesting a soft lock of a section of physical memory; and a memory monitor for monitoring for changes in focus, for instructing the physical memory manager to release a section of physical memory locked by an application program when the application loses the focus, and for restoring the section of physical memory when the application regains the focus.

11. The operating system of claim 10 wherein:

the API implementation includes an API function call for designating a selected piece of code or data as high priority, the API implementation causes the physical memory manager to assign a high priority to the selected piece of code or data, and the physical memory manager compares the selected priority with dynamically determined priority based on frequency of access to a piece of code or data to determine which portions of code or data to swap to secondary storage to process a not present interrupt.

12. The operating system of claim 10 wherein the physical memory manager monitors the amount of available physical memory and sends a message to the memory monitor when the amount of available physical memory falls below a threshold; and wherein the memory monitor is responsive to the message to release a soft lock requested by an application program.

13. The operating system of claim 10 wherein the memory monitor is operable to monitor the amount of physical memory and overrides a soft lock by releasing at least a portion of soft locked code or data when the amount of available physical memory falls below a predetermined threshold.

14. The operating system of claim 10 wherein the memory monitor is operable to monitor for conditions that occur at run time that require release of the soft lock, and in response to detecting one of the conditions, is operable to release at least a portion of the soft locked code or data.

15. The operating system of claim 14 wherein the conditions include a high priority process requesting access to a piece of physical memory.

16. The operating system of claim 10 further including a user interface for prompting the user to select a maximum amount of memory that can be locked by an application program.

17. A method for allowing concurrently executing applications to control allocation of memory in a virtual memory system, the method comprising:

in response to a request from an application program to designate a priority for physical memory allocation of code or data designated by the application, assigning a priority status for the designated code or data; and using the designated priority in virtual memory management to determine the order in which units of memory, allocated to physical memory, will be swapped to secondary storage to satisfy a request for physical memory.

18. The method of claim 17 further including:

managing virtual memory by swapping units of memory from physical memory to secondary storage in a least recently used order;

assigning a most recently used priority to units of memory used to store the designated code or data such that the designated code or data has at least as high of a priority to physical memory as non-designated code or data, which is assigned a priority based on the least recently used order.

19. The method of claim 17 including:

managing virtual memory by swapping units of memory from physical memory to secondary storage based on a priority assigned to the units dynamically, by the virtual memory management, based on accesses to the units of memory; and overriding the priority by assigning the priority status designated by the application to units of memory associated with the designated code or data.

20. The method of claim 17 wherein the application program can specify two or more different levels of priority of access to physical memory for the designated code or data.

21. The method of claim 20 further including:

managing virtual memory by swapping units of memory from physical memory to secondary storage based on a priority assigned to the units dynamically, by the virtual memory management, based on accesses to the units of memory; and overriding the dynamically assigned priority by assigning the priority status designated by the application to units of memory associated with the designated code or data.

22. The method of claim 21 wherein the priority is assigned dynamically based on how recently the units of memory are used; and wherein the step of overriding the dynamically assigned priority includes assigning a predetermined value associated with the level of priority specified by the application program.

23. A computer readable medium having computer-executable instructions for performing the steps of claim 17.

24. An operating system comprising:

a physical memory manager for supporting a virtual memory space larger than physical memory in a computer by swapping code and data between the physical memory and secondary storage, and for managing a pool of physical memory available to be allocated to concurrently running application programs, an API implementation for receiving API calls from concurrently executing application programs, the API implementation including an API function call for designating a priority of specified code or data to be used by the physical memory manager to determine the order in which units of memory are swapped from physical memory to secondary storage of a computer.

25. The operating system of claim 24 wherein the physical memory manager is operable to assign a priority to the units of memory based on how recently each unit is used and is operable to swap units of memory from the physical memory to the secondary storage in least recently used order; and wherein the API implementation is operable to override the priority assigned by the physical memory manager based on use and set the priority based on the priority specified by an application program in the API function call.

* * * * *